US009581248B2

(12) United States Patent
Itadani et al.

(10) Patent No.: US 9,581,248 B2
(45) Date of Patent: Feb. 28, 2017

(54) MECHANICAL SEAL

(71) Applicant: EAGLE INDUSTRY CO., LTD., Tokyo (JP)

(72) Inventors: Masatoshi Itadani, Tokyo (JP); Takashi Shinomiya, Tokyo (JP); Yoshihiro Ogawa, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 15/159,049

(22) Filed: May 19, 2016

(65) Prior Publication Data
US 2016/0281856 A1 Sep. 29, 2016

Related U.S. Application Data

(62) Division of application No. 14/407,372, filed as application No. PCT/JP2013/076968 on Oct. 3, 2013.

(30) Foreign Application Priority Data

Oct. 4, 2012 (JP) ................................. 2012-222233

(51) Int. Cl.
*F16J 15/34* (2006.01)
*F16J 15/36* (2006.01)

(52) U.S. Cl.
CPC .............. *F16J 15/363* (2013.01); *F16J 15/34* (2013.01); *F16J 15/3448* (2013.01); *F16J 15/3452* (2013.01)

(58) Field of Classification Search
CPC ........ F16J 15/34; F16J 15/363; F16J 15/3452; F16J 15/348; F16J 15/3484; F16J 15/3436; F16J 15/344; F16J 15/3464; F16J 15/36
See application file for complete search history.

(56) References Cited

U.S. PATENT DOCUMENTS 2,100,220 A * 11/1937 King ......................... F16J 15/36
  277/391
2,610,874 A *  9/1952 Payne ....................... F16J 15/36
  277/373

(Continued)

FOREIGN PATENT DOCUMENTS

CN    1174306    2/1998    ............... F16J 15/34
FR    2594519    8/1987    ............... F16J 15/36

(Continued)

OTHER PUBLICATIONS

USPTO Office Action issued in parent U.S. Appl. No. 14/407,372, dated Oct. 7, 2016 (22 pgs).

(Continued)

*Primary Examiner* — Kristina Fulton
*Assistant Examiner* — L. Susmitha Koneru
(74) *Attorney, Agent, or Firm* — Hayes Soloway P.C.

(57) ABSTRACT

To provide a mechanical seal in which degradation or tearing of a bellows does not occur, the spring constant of the bellows is reduced, and the fluctuation in the load due to stretching and contracting of the bellows is reduced. An inside-type mechanical seal includes a sleeve fixed to a rotating shaft, and a cartridge fixed to a housing. A rotation-side sealing ring is provided to the sleeve. A fixed-side sealing ring, which slides against the rotation-side sealing ring, and a bellows for axially urging the fixed-side sealing ring is provided to the cartridge. The bellows is made from a metal; and the metal bellows has one end fixed to a case for holding the fixed-side sealing ring and another end fixed to the cartridge. The plate thickness of the metal bellows is set so as to be smaller than the plate thickness of the case or the cartridge.

3 Claims, 9 Drawing Sheets

(56) References Cited

U.S. PATENT DOCUMENTS

| | | | | |
|---|---|---|---|---|
| 3,193,266 | A | * | 7/1965 | Becker ................... F16J 15/363 110/271 |
| 4,136,887 | A | | 1/1979 | Wentworth, Jr. ............... 277/43 |
| 4,193,756 | A | * | 3/1980 | Leon ......................... F27B 7/24 277/389 |
| 4,261,581 | A | * | 4/1981 | Hershey .................. F16J 15/363 277/370 |
| 4,365,816 | A | | 12/1982 | Johnson et al. ................ 277/88 |
| 4,378,119 | A | * | 3/1983 | Luxford .................. F16J 15/363 277/389 |
| 4,691,927 | A | | 9/1987 | Sudol et al. ..................... 277/26 |
| 5,011,166 | A | * | 4/1991 | Watts ..................... F16J 15/363 277/379 |
| 5,725,219 | A | | 3/1998 | Gilbert ............................. 277/8 |
| 5,797,602 | A | * | 8/1998 | Less ....................... F16J 15/348 277/372 |
| 5,893,564 | A | * | 4/1999 | Yang ...................... F16J 15/348 277/374 |
| 5,954,341 | A | * | 9/1999 | Ringer ................... F16J 15/363 277/361 |
| 6,145,841 | A | | 11/2000 | Maeda .......................... 277/358 |
| 6,341,781 | B1 | * | 1/2002 | Matz ....................... F16J 15/36 277/389 |
| 2002/0113375 | A1 | * | 8/2002 | Ruderman ............... F16J 15/52 277/389 |
| 2003/0006560 | A1 | | 1/2003 | Dahlheimer ................... 277/389 |
| 2006/0038353 | A1 | * | 2/2006 | Murakami ............ F04D 29/126 277/399 |
| 2014/0319774 | A1 | * | 10/2014 | Borasso ............... F16J 15/3452 277/385 |

FOREIGN PATENT DOCUMENTS

| | | | |
|---|---|---|---|
| GB | 1007552 | 10/1965 | ............... F16J 15/36 |
| GB | 2229777 | 10/1990 | ............... F16J 15/36 |
| JP | S57101165 | 6/1982 | ............... F16J 15/36 |
| JP | S6154553 | 4/1986 | ............... F16J 15/34 |
| JP | S6353959 | 4/1988 | ............... F16J 15/36 |
| JP | H02283972 | 11/1990 | ............... F16J 15/34 |
| JP | H05157096 | 6/1993 | ............ F04D 29/12 |
| JP | H09144536 | 6/1997 | ................ F01P 5/10 |
| JP | H1162890 | 3/1999 | ............ F04D 29/12 |
| JP | 2956862 | 10/1999 | ............ F04D 29/12 |
| JP | 2000074226 | 3/2000 | ............... F16J 15/36 |

OTHER PUBLICATIONS

Chinese Office Action (w/translation) issued in application No. 201380030374.1, dated Aug. 15, 2016 (18 pgs).

Chinese Office Action (w/translation) issued in application No. 201380030374.1, dated Oct. 26, 2015 (14 pgs).

International Preliminary Report on Patentability issued in related PCT Patent Appln. No. PCT/JP2013/076968, dated Apr. 16, 2015 (8 pgs).

International Search Report issued in corresponding application No. PCT/JP2013/076968, dated Oct. 25, 2013 (4 pgs).

Office Action issued in U.S. Appl. No. 14/407,372, dated May 20, 2016 (17 pgs).

Office Action issued in U.S. Appl. No. 14/407,372, dated Nov. 12, 2015 (24 pgs).

* cited by examiner

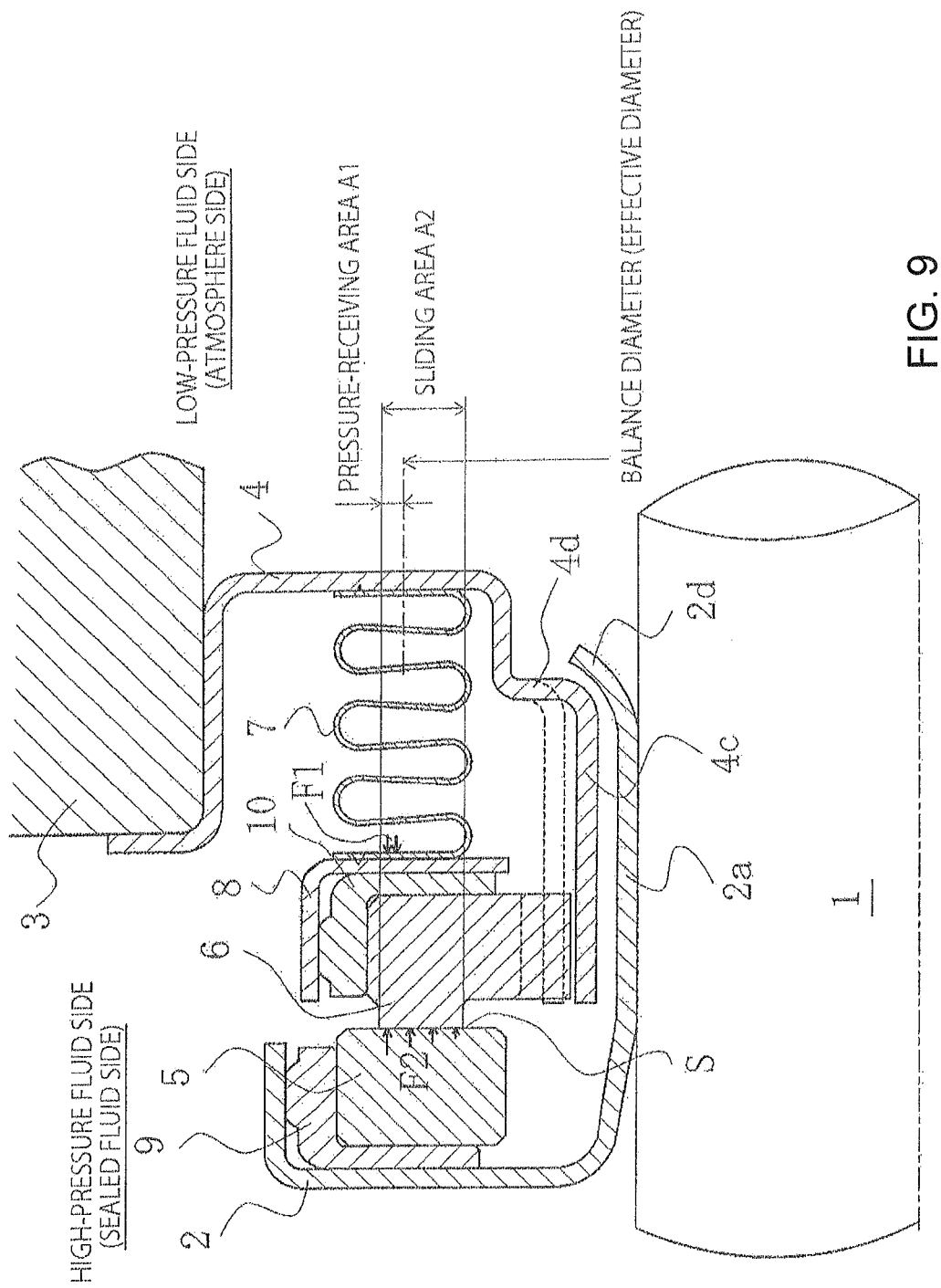

MECHANICAL SEAL

Cross Reference to Related Application

This application is a divisional of U.S. application No. 14/407,372, filed Dec. 11, 2014, which in turn is a 35 U.S.C. 0371 application based on PCT/JP2013/076968, filed Oct. 3, 2013.

TECHNICAL FIELD

The present invention relates to a mechanical seal used, e.g., as a shaft-sealing device in a pump or the like.

BACKGROUND ART

One conventionally known type of a mechanical seal is, as shown in FIG. 7, an inside-format mechanical seal in which a sealed fluid that may leak from the outer circumference of a sealing face to the inner circumference direction is sealed, wherein: an annular rotation-side sealing ring 53 provided, via a sleeve 51 and a cup gasket 52, on the side of a rotating shaft 50 for driving a pump impeller (not shown) on the high-pressure fluid-side, so as to be capable of rotating integrally with the rotating shaft 50; and an annular fixed-side sealing ring 55 provided, via a bellows 57 in a cartridge 56, to a housing 54 Document of the pump in a non-rotating state so as to be capable of axial movement, are caused by the bellows 57 and a coiled wave spring 58 axially urging the fixed-side sealing ring 55 to slide against each other in intimate contact at respective sealing faces S which have been mirror-surface-finished by lapping or the like (hereafter referred to as "prior art 1"; see, e.g., Patent Document 1). The bellows 57 in the mechanical seal in this prior art is made from rubber, and has one end attached to the fixed ring 55 via a case 59 and the other end attached to a cartridge inner cylinder part 56 via a driving band 60.

Patent Document 2 discloses an invention of a mechanical seal in which, as shown in PIG. 8, a fixed-side sealing ring 62 is attached to a housing 61, a rotation-side sealing ring 63 is provided to a shaft which is rotatably supported by the housing 61, and the fixed-side sealing ring 62 and the rotation-side sealing ring 63 are in elastic contact with each other so as to be capable of sliding, wherein a fixing claw 64a is formed on the right end of a metal bellows 64 so that the metal bellows 64 supports the fixed-side sealing ring 62 so as to be capable of axial movement, the fixing claw 64a is bent and the fixed-side sealing ring 62 is supported at the right-end interior of the metal bellows 64, and the left end of the metal bellows 64 is directly fixed to the housing 61 (hereafter referred to as "prior art 2"; see Patent Citation 2).

However, in prior art 1, the bellows 57 being made from rubber presents problems such as degradation or tearing of the bent part. Problems are also presented in that an urging member such as the coiled wave spring 58 and an attaching member such as the driving band 60 are required, increasing the number of components.

In prior art 2, since the structure is one in which the fixed ring 62 is directly supported by the metal bellows 64 and the metal bellows 64 is directly fixed to the housing 61 such that the metal bellows 64 functions also as a cartridge, a problem is presented in that the metal bellows 64 must have the same thickness as that of a cartridge or a case, resulting in an increase in the spring constant of the metal bellows 64,

PRIOR ART DOCUMENTS

Patent Documents

Patent Document 1: Japanese Laid-Open Patent Application No. 2000-74226 (page 3, FIG. 2)
Patent Document 2: Japanese Patent No. 2956862 (page 5, FIG. 5)

SUMMARY OF INVENTION

Problems to be Solved by the Invention

The present invention was devised in order to resolve the problems presented by the prior art, it being an object thereof to provide a mechanical seal in which degradation or tearing of a bellows does not occur, the spring constant of the bellows is reduced, and the fluctuation in the load due to stretching and contracting of the bellows is reduced. In addition, assembly of [a mechanical seal] through integrating the rotation-side and the fixed-side normally necessitates increasing the inside diameter of the bellows in order to secure sufficient space, which changes the pressure-receiving area of the bellows and results in a fluctuation in the balance value; an object of the present invention is to provide a mechanical seal in which the fluctuation in the balance value in such an instance is minimized.

Means for Solving the Problem

In order to achieve the following objects, first, a mechanical seal according to the present invention is an inside-type mechanical seal comprising a sleeve fixed to a rotating shaft, and a cartridge fixed to a housing; a rotation-side sealing ring being provided to said sleeve; and a fixed-side sealing ring, which slides against the rotation-side sealing ring, and a bellows for axially urging the fixed-side sealing ring, being provided to the cartridge; the mechanical seal being characterized in that: the bellows is made from a metal; and the metal bellows has one end fixed to a case for holding the fixed-side sealing ring and another end fixed to the cartridge, the plate thickness of the metal bellows being set so as to be smaller than the plate thickness of the case or the cartridge. According to this characteristic, the metal bellows exclusively plays a role of axially urging the fixed-side sealing ring, and is formed as a separate body with respect to the case, the cartridge, or the like. Therefore, the plate thickness of the metal bellows can be reduced, the spring constant of the metal bellows can be reduced, and a change in load with respect to the amount of stretching and contracting of the metal bellows can be reduced. Therefore, even when the rotation-side sealing ring is axially displaced, the axial urging force on the fixed-side sealing ring can be kept stable, and the pressure at the sealing face can be maintained at an optimum value. In addition, the tolerance of the length of attachment of the metal bellows can be relaxed. In addition, using a metal bellows instead of a conventional rubber bellows prevents degradation or tearing of the bellows and makes it possible to increase the lifespan. Also, the number of components for attachment can be reduced compared to instances in which a rubber bellows is used. Furthermore, the spring constant of the bellows can be freely set by the material, the plate thickness, or the number of crests. Also, the balance value can be set to an optimum value.

Second, a mechanical seal according to the first aspect of the present invention is characterized in that: the metal bellows comprises a bellows part in which crest parts and trough parts are alternately formed, and a disc-shaped flange part extending radially outwards from the trough part at each end of the bellows part; and the bellows part is formed by molding or welding so that the outer diameter of the flange parts is greater than the diameter of the crest parts, and the inner diameter of the flange parts is substantially the same as or slightly larger than the diameter of the trough parts. According to this characteristic, it is possible to easily fix the metal bellows to the case and the cartridge and to prevent the sealed fluid from leaking.

Third, a mechanical seal according to the first or second aspect of the present invention is characterized in that: fixing of the metal bellows to the metal case and the metal cartridge is performed by welding or fusing at each position located slightly further towards the inner diameter side relative to the outer diameter of the flange part of the metal bellows. According to this characteristic, it is possible for the inner circumferential part of the flange part of the metal bellows to separate from the case and the cartridge, and it is possible to obtain a stable sealing performance and excellent tracking performance with respect to the eccentricity of the rotating shaft. In addition, the metal bellows can be fixed in a reliable manner without using a special attachment member.

Fourth, a mechanical seal according to any of the first through third aspects of the present invention is characterized in that the rotation-side sealing ring is fixed to the sleeve via a cup gasket, and the cup gasket is provided across an outer circumferential surface and a side opposite the sealing face of the rotation-side sealing ring. According to this characteristic, it is possible to prevent the cup gasket from detaching, even when the pressure of a high-pressure fluid acts on the outer circumferential surface of the cup gasket.

Fifth, a mechanical seal of the present invention is an inside-type mechanical seal comprising a sleeve fixed to a rotating shaft, and a cartridge fixed to a housing; a rotation-side sealing ring being provided to the sleeve; and a fixed-side sealing ring, which slides against the rotation-side sealing ring, and a bellows for axially urging the fixed-side sealing ring, being provided to the cartridge; the mechanical seal being characterized in that:

the bellows is made from a metal; and the metal bellows has one end fixed to a gasket for holding the fixed-side sealing ring and another end fixed to the cartridge, the plate thickness of the metal bellows being set so as to be smaller than the plate thickness of the cartridge.

According to this characteristic, the metal bellows is formed so as to also function as a case, making it possible to reduce the number of components and reduce the number of welded locations.

Sixth, a mechanical seal according to the fifth aspect of the present invention is characterized in that a band is attached on an outer circumference of an outer cylinder part of the metal bellows fitting into the gasket holding the fixed-side sealing ring. This characteristic makes it possible for the fitting between the metal bellows and the cup gasket to be made more reliable.

Seventh, a mechanical seal of the present invention is an inside-type mechanical seal comprising a sleeve fixed to a rotating shaft, and a cartridge fixed to a housing; a rotation-side sealing ring being provided to the sleeve; and a fixed-side sealing ring, which slides against the rotation-side sealing ring, and a bellows for axially urging the fixed-side sealing ring, being provided to the cartridge; the mechanical seal being characterized in that: the bellows is made from a metal; and the metal bellows has one end directly fixed to the fixed-side sealing ring and another end fixed to the cartridge, the plate thickness of the metal bellows being set so as to be smaller than the plate thickness of the cartridge. According to this characteristic, it is possible to reduce the number of components and reduce the axial length of the mechanical seal. Alternatively, instead of reducing the axial length of the mechanical seal, it is also possible to increase the number of crests of the metal bellows.

Eighth, a mechanical seal according to any of first through seventh aspects of the present invention is characterized in being of a type in which a distal end of an inner cylinder part of the sleeve is expanded in diameter by crimping and caused to engage with an inner cylinder part of the cartridge, thereby preventing the cartridge and the sleeve from axial detachment, wherein:

a portion of the inner cylinder part of the cartridge located on the opposite axial-direction side relative to the fixed-side sealing ring side is expanded in diameter and provided with a stepped part; and the bellows is formed so that the inner diameter of a portion positioned on the fixed-side sealing ring side relative to the stepped part of the inner cylinder part of the cartridge is smaller than the inner diameter of a portion positioned on the opposite side from the fixed-side sealing ring relative to the stepped part of the inner cylinder part of the cartridge.

According to this characteristic, it is possible to suppress a decrease in the balance value, reduce the amount of leakage at the sealing face, and suppress an increase in the spring constant of the bellows, without increasing the outer diameter of the bellows. In addition, it is possible to suppress an increase in the diameters of the rotation-side sealing ring and the fixed-side sealing ring and avoid an increase in size of the mechanical seal, even when the balance value is set so as to exceed 100%.

Effect of the Invention

The present invention has the following beneficial effects.

(1) Having the bellows be made from a metal, the metal bellows having one end fixed to a case for holding the fixed-side sealing ring and another end fixed to the cartridge, the plate thickness of the metal bellows being set so as to be smaller than the plate thickness of the case or the cartridge, result in the metal bellows exclusively playing a role of axially urging the fixed-side sealing ring, and being formed separately from the case, the cartridge, or the like. Therefore, the plate thickness of the metal bellows can be reduced, the spring constant of the metal bellows can be reduced, and a change in load with respect to the amount of stretching and contracting of the metal bellows can be reduced. Therefore, even when the rotation-side sealing ring is axially displaced, the axial urging force on the fixed-side sealing ring can be kept stable, and the pressure at the sealing face can be maintained at an optimum value. In addition, the tolerance of the length of attachment of the metal bellows can be relaxed. In addition, using a metal bellows instead of a conventional rubber bellows prevents degradation or tearing of the bellows and makes it possible to increase the lifespan. Also, the number of components for attachment can be reduced compared to instances in which a rubber bellows is used. Furthermore, the spring constant of the bellows can be freely set by the material, the plate thickness, or the number of crests. Also, the balance value can be set to an optimum value.

(2) The metal bellows comprising a bellows part in which crest parts and trough parts are alternately formed, and a disc-shaped flange part extending radially outwards from the trough part at each end of the bellows part; and the bellows part being formed by molding or welding so that the outer diameter of the flange parts is greater than the diameter of the crest parts, and the inner diameter of the flange parts is substantially the same as or slightly larger than the diameter of the trough parts, result in it being possible to easily fix the metal bellows to the case and the cartridge and to prevent the sealed fluid from leaking.

(3) Fixing of the metal bellows to the metal case and the metal cartridge being performed by welding or fusing at each position located slightly further towards the inner diameter side relative to the outer diameter of the flange part of the metal bellows results in it being possible for the inner circumferential part of the flange part of the metal bellows to separate from the case and the cartridge, and it being possible to obtain a stable sealing performance and excellent tracking performance with respect to the eccentricity of the rotating shaft. In addition, the metal bellows can be fixed in a reliable manner without using a special attachment member.

(4) The rotation-side sealing ring being fixed to the sleeve via a cup gasket, and the cup gasket being provided across an outer circumferential surface and a side opposite the sealing face of the rotation-side sealing ring, result in it being possible to prevent the cup gasket from detaching, even when the pressure of a high-pressure fluid acts on the outer circumferential surface of the cup gasket.

(5) The metal bellows having one end fixed to a gasket for holding the fixed-side sealing ring and another end fixed to the cartridge, whereby the metal bellows is formed so as to also function as a case, making it possible to reduce the number of components and reduce the number of welded locations.

(6) A band being attached on an outer circumference of an outer cylinder part of the metal bellows fitting into the gasket holding the fixed-side sealing ring makes it possible for the fitting between the metal bellows and the cup gasket to be made more reliable.

(7) The metal bellows having one end directly fixed to the fixed-side sealing ring and another end fixed to the cartridge results in it being possible to reduce the number of components and reduce the axial length of the mechanical seal. Alternatively, instead of reducing the axial length of the mechanical seal, it is also possible to increase the number of crests of the metal bellows.

(8) {The mechanical seal} being of a type in which a distal end of an inner cylinder part of the sleeve is expanded in diameter by crimping and caused to engage with an inner cylinder part of the cartridge, thereby preventing the cartridge and the sleeve from axial detachment, wherein: a portion of the inner cylinder part of the cartridge located on the opposite axial-direction side relative to the fixed-side sealing ring side is expanded in diameter and provided with a stepped part; and the bellows is formed so that the inner diameter of a portion positioned on the fixed-side sealing ring side relative to the stepped part of the inner cylinder part of the cartridge is smaller than the inner diameter of a portion positioned on the opposite side from the fixed-side sealing ring relative to the stepped part of the inner cylinder part of the cartridge, results in it being possible to suppress a decrease in the balance value, reduce the amount of leakage at the sealing face, and suppress an increase in the spring constant of the bellows, without increasing the outer diameter of the bellows. In addition, it is possible to suppress an increase in the diameters of the rotation-side sealing ring and the fixed-side sealing ring and avoid an increase in size of the mechanical seal, even if the balance value is set so as to exceed 100%.

BRIEF DESCRIPTION OF DRAWINGS

FIG. 9 is a vertical cross-section view showing a principal part of a reference example for illustrating the mechanical seal according to the fifth and sixth examples of the present invention.

DESCRIPTION OF EMBODIMENTS

Embodiments for carrying out this invention will now be described by way of example with reference to the accompanying drawings. The examples are not intended to limit the dimensions, material, shape, relative arrangement, and other attributes of constituent components to those set forth in the examples unless expressly specified otherwise.

FIRST EXAMPLE

Figure 1:
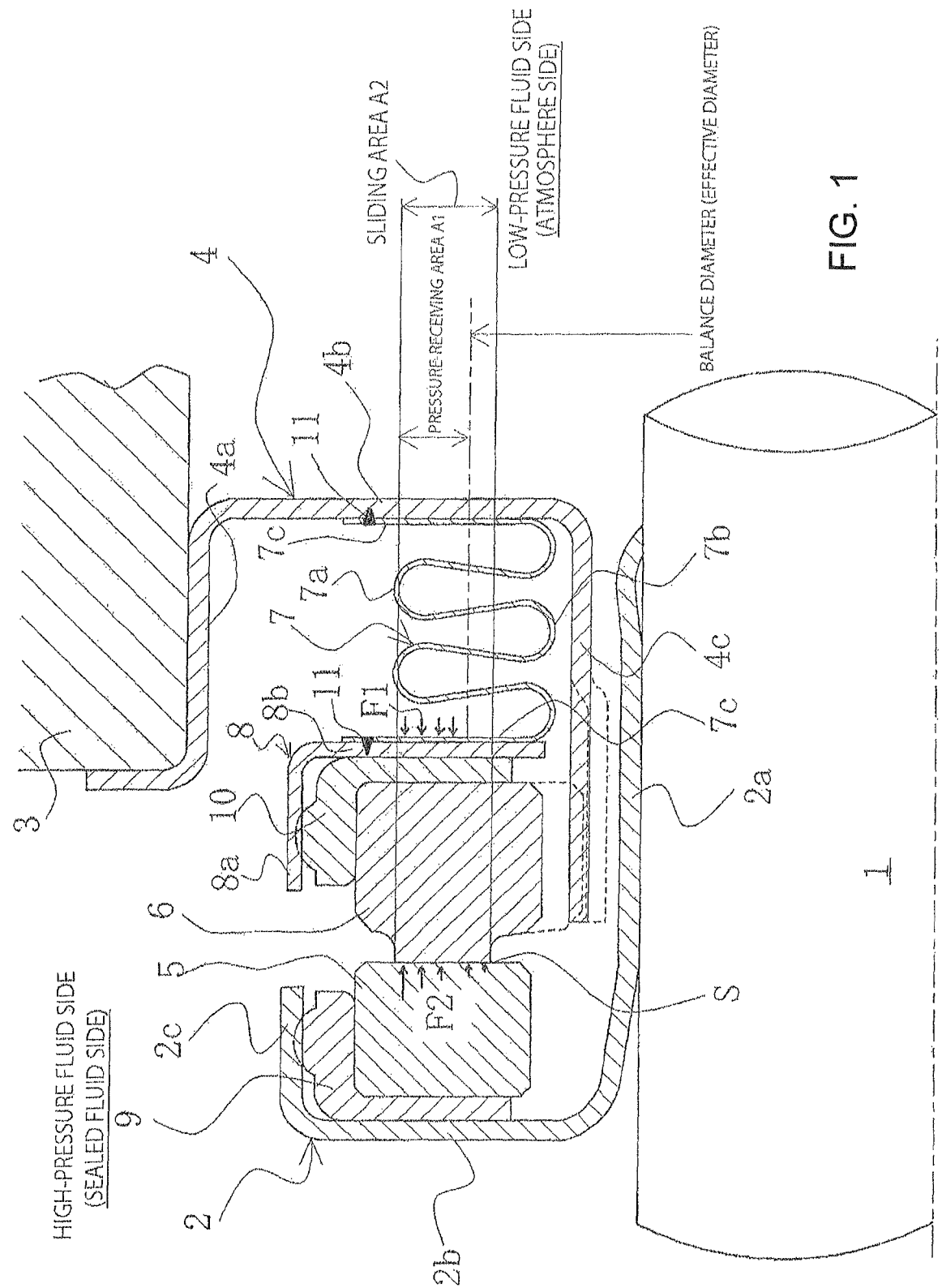
FIG. 1 is a vertical cross-section view showing a principal part of a mechanical seal according to a first example of the present invention.

A description will now be given for a mechanical seal according to a first example of the present invention. The present invention is applied to an inside-type mechanical seal of a format in which a fluid trying to leak from the outer circumference of the sealing face to the inner circumference direction is sealed. In FIG. 1, the left side corresponds to the high-pressure fluid side (sealed fluid side) and the right side corresponds to the low-pressure fluid side (atmosphere side).

The mechanical seal according to the present invention is a mechanical seal comprising a sleeve 2 fixed to a rotating shaft 1, and a cartridge 4 fixed to a housing 3; a rotation-side sealing ring 5 being provided to the sleeve 2; and a fixed-side sealing ring 6, which slides against the rotation-side sealing ring 5, and a bellows 7 for axially urging the fixed-side sealing ring 6 being provided to the cartridge 4; the mechanical seal being mainly characterized in that: the bellows 7 is made from a metal;

and the metal bellows 7 has one end fixed to a case 8 for holding the fixed-side sealing ring 6 and another end fixed to the cartridge. 4, and has a plate thickness set so as to be smaller than the plate thickness of the case 8 or the cartridge 4.

For example, a pump impeller (not shown) is fixed to the high-pressure-fluid side of the rotating shaft 1, and the shaft-sealing part between the inner diameter side of the housing 3 and the outer diameter side of the rotating shaft 1 of the pump has the mechanical seal of the present invention installed thereto and sealed.

The sleeve 2 has: an inner cylinder part 2a fitted to the rotating shaft 1; a disc part 2b extending in the outer diameter direction from the high-pressure-fluid side of the inner cylinder part 2a; and an outer cylinder part 2c extending from the outer diameter side of the disc part 2b to the low-pressure-fluid side. The sleeve 2 supports the rotation-side sealing ring 5 to the low-pressure-fluid side having a substantially C-shaped cross-section via a cup gasket 9. The cup gasket 9 is provided across the outer circumferential surface and the side opposite the sealing face of the rotation-side sealing ring 5. Therefore, even when the pressure of the high-pressure fluid acts on the outer circumferential surface of the cup gasket 9, the cup gasket 9 will not detach.

The cartridge 4 is made from, e.g., a metal, and has: an outer cylinder part 4a fitting into the inner circumference of the housing 3; a disc part 4b extending radially inwards from the low-pressure-fluid side of the outer cylinder part 4a; and an inner cylinder part 4c extending to the high-pressure-fluid side along the rotating shaft from the inner diameter part of the 4b, The cartridge 4 supports, via the metal bellows 7, the fixed-side sealing ring 6 to the high-pressure-fluid side having a substantially C-shaped cross-section so as to be capable of axially moving. The cartridge 4 is formed as a cartridge format capable of being attached to and detached from the housing 3. The plate thickness of the cartridge 4 is, e.g., in the instance of a metal cartridge, approximately 0.4 mm.

The outer circumferential surface and the side opposite the sealing face of the fixed-side sealing ring 6 are held by the case 8 via a cup gasket 10. The case 8 is made, e.g., from a metal, has a substantially inverse L-shaped cross-section having an outer cylinder part 8a and a disc part 8b, holds the fixed-side sealing ring 6 to the high-pressure-fluid side via the cup gasket 10, and is fixed, at the low-pressure-fluid side of the disc part 8b, to one end of the metal bellows 7. The plate thickness of the case 8 is, in the instance of a metal case, approximately 0.4 mm. The cup gaskets 9 and 10 are capable of elastically deforming, and is [made from a material] selected from, e.g., rubber, a resin, or a metal.

The metal bellows 7 has one end fixed to the disc part 8b of the metal case 8 for holding the fixed-side sealing ring 6 and another end fixed to the disc part 4b of the metal cartridge 4 by welding or other means. In other words, the metal bellows 7 is formed as a separate body with respect to the case 8 and the cartridge 4.

In a bellows 7 comprising a stretchable bellows part in which crest parts 7a and trough parts 7b are alternately formed, a disc-shaped flange part 7c extending from a trough part 7b of the bellows 7 is provided at each axial end part of the bellows 7, the inner diameter of the flange parts 7c, 7c is formed so as to be substantially the same as or slightly larger than the trough parts 7b of the bellows 7, and the outer diameter of the flange parts 7c is formed so as to be larger than the crest parts 7a of the bellows 7. The flange parts 7c, 7c at both ends of the bellows 7 are fixed to the disc part 8b of the case 8 and the disc part 4b of the cartridge 4, [respectively]. When the fixing is performed, [the flange parts 7c] are welded or fused to the case 8 and the cartridge 4 at each position 11 located slightly further towards the inner diameter side relative to the outer diameter of the flange part 7c formed so as to be greater than the outer diameter of the crest parts 7a of the bellows 7. It thereby becomes possible to easily fix the bellows 7 to the case 8 and the cartridge 4 and prevent the sealed fluid from leaking. The disc part 8b of the case 8 extends slightly further towards the inner diameter side than the flange part 7c of the bellows 7, and supports the entire flange part 7c of the bellows 7, whereby the action and the spring constant of the bellows 7 are made more stable, and sealing performance is maintained. Since welding is only performed [at a position located] slightly further towards the inner diameter side relative to the outer diameter of the flange part 7c of the bellows 7, it is possible for the inner circumferential parts of the flange parts 7c of the bellows 7 to separate from the disc part 8b of the case 8 and the disc part 4b of the cartridge 4, and it is possible to obtain a stable sealing performance and excellent tracking performance with respect to the eccentricity of the rotating shaft 1.

Typical examples of the material constituting the metal bellows 7 include SUS304, SUS316L, AM350, and Inconel 625. The metal bellows 7 is made from a molded bellows formed by molding or a welded bellows formed by welding. The plate thickness of the metal bellows 7 is set so as to be smaller than the plate thickness of the metal case 8 or the metal cartridge 4. For example, the plate thickness of the metal bellows 7 is set to approximately 0.1 mm, and formed so as to be significantly less than the plate thickness of the case 8 or the cartridge 4.

Reducing the plate thickness of the metal bellows 7 reduces the spring constant of the bellows 7 and reduces the change in load in relation to the amount of stretching and contacting of the bellows 7. Thus, reducing the change in load in relation to the amount of stretching and contracting of the bellows 7 stabilizes the axial urging force on the fixed-side sealing ring 6, even when the rotation-side sealing ring 5 is axially displaced, making it possible to maintain the pressure at the sealing face at an optimum value. There is also a benefit in that the tolerance of the length of attachment of the bellows 7 can be relaxed. In FIG. 1, the metal bellows 7 has two crests; however, the number of crests can be changed as required, e.g., to three crests if the load in relation to the amount of stretching and contacting of the bellows 7 is reduced, or to one crest if the axial length is reduced.

The effective diameter of the metal bellows 7 (i.e., the diameter midway between the inner and outer diameters) and the positional relationship of the sealing face S in the radial direction are set so that a force F1 pressing the fixed-side sealing ring 6 towards the side of the sealing face and a force F2 pressing the fixed-side sealing ring 6 towards the side opposite the sealing face are balanced at a given relationship. In the instance of the example shown in FIG. 1, if A1 represents the pressure-receiving area of the metal bellows 7 at which pressure from the sealed fluid is received (i.e., the pressure-receiving area at which the pressure from the sealed fluid is received by the bellows 7 for pressing the fixed-side sealing ring 6 towards the side of the sealing face, represented by the area between the effective diameter of the bellows 7 and the outer diameter of the sealing face S; the same definition applies hereafter) and A2 represents the sliding area between the rotation-side sealing ring 5 and the fixed-side sealing ring 6, the balance value represented by the ratio A1/A2 is set to a range of 50%≤balance value≤100%. The balance value can be changed through setting the balance diameter (effective diameter) and the sliding area, and is normally set so as to be larger if the pressure of the sealed fluid is higher and smaller if the pressure of the sealed fluid is lower.

Using a metal bellows instead of a conventional rubber bellows prevents degradation or tearing of the bellows and makes it possible to increase the lifespan. Also, the number of components for attachment can be reduced compared to instances in which a rubber bellows is used. Furthermore, the spring constant of the bellows can be freely set by the material, the plate thickness, or the number of crests. Also, the balance value can be set to an optimum value.

SECOND EXAMPLE

Next, a description will be given for a mechanical seal according to a second example of the present invention with reference to FIG. 2. The second example, shown in FIG. 2, differs from the first example shown in FIG. 1 in having the metal bellows formed so as to also function as the case. However, other configurations are the same as those in the first example, and descriptions that overlap will not be provided.

Figure 2:
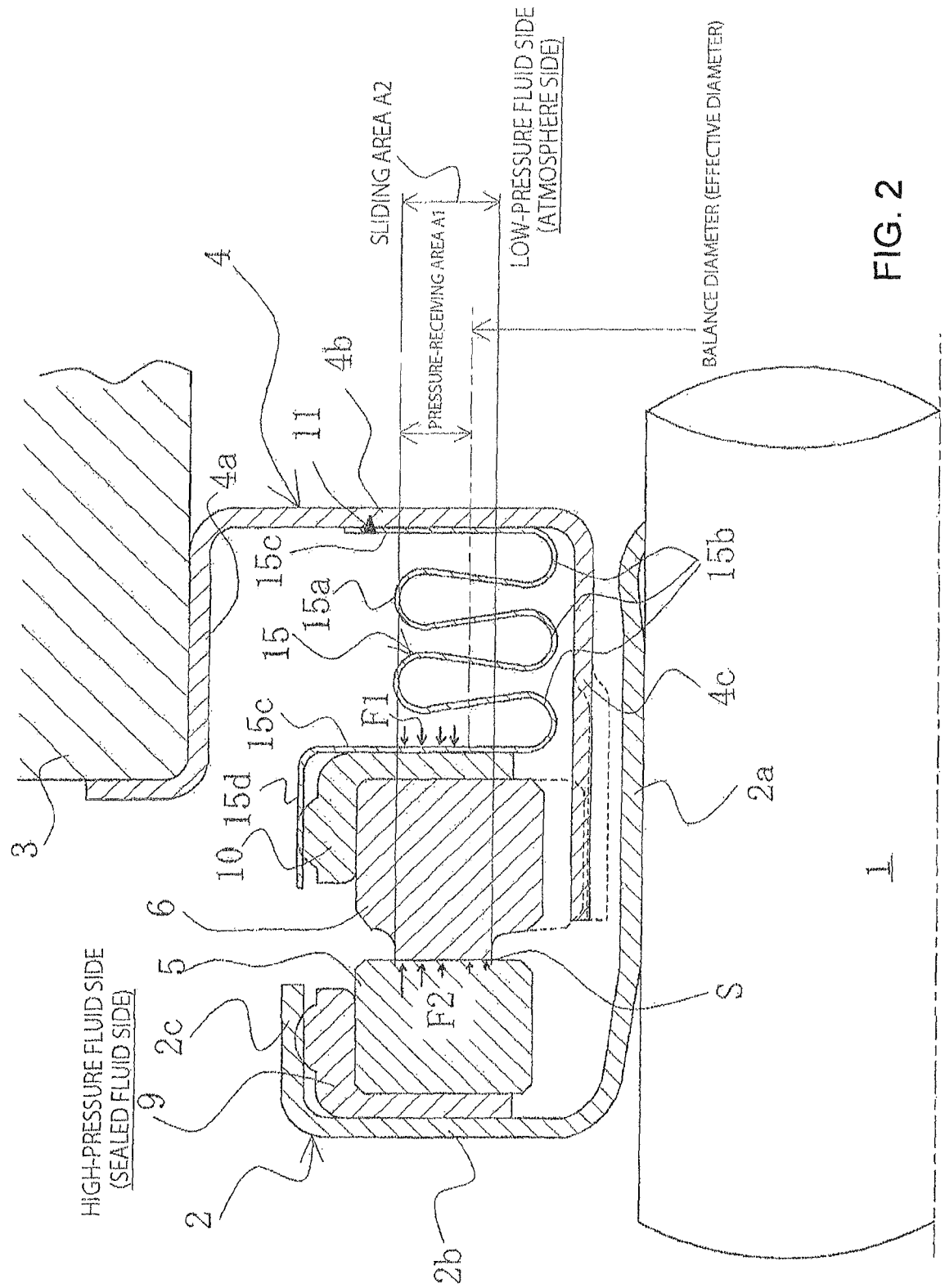
FIG. 2 is a vertical cross-section view showing a principal part of a mechanical seal according to a second example of the present invention.

In FIG. 2, a bellows 15 comprises a stretchable bellows part in which crest parts 15a and trough parts 15b are alternately formed, a disc-shaped flange part 15c extending from a trough part 15b of the bellows 15 is provided at each axial end part of the bellows 15, the inner diameter of the flange parts 15c, 15c is formed so as to be substantially the same as or slightly larger than the trough parts 15b of the bellows 15, and the outer diameter of the flange parts 15c is formed so as to be larger than the crest parts 15a of the bellows 15. The flange part 15c of the bellows 15 on the side towards the cartridge 4 is fixed to the disc part 4b of the cartridge 4. An outer cylinder part 15d is formed continuously on the flange part 15c on the side towards the fixed-side sealing ring 6 so as to fit with the outer circumferential surface of the cup gasket 10 for holding the fixed-side sealing ring 6, and the outer cylinder part 15d and the outer circumferential surface of the cup gasket 10 fit to each other elastically. When the flange part 15c on the side towards the cartridge 4 is fixed to the disc part 4b of the cartridge 4, [the flange part 15c] is welded or fused to the cartridge 4 at a position 11 located slightly further towards the inner diameter side relative to the outer diameter of the flange part 15c formed so as to be greater than the outer diameter of the crest parts 15a of the bellows 15. It thereby becomes possible to easily fix the bellows 15 to the cartridge 4 and the cup gasket 10 and prevent the sealed fluid from leaking. Since the flange part 7c of the bellows 15 on the side towards the cartridge 4 is welded only [at a position located] slightly further towards the inner diameter side relative to the outer diameter, and the flange part 15c on the side towards the fixed-side sealing ring 6 is elastically joined to the side surface of the cup gasket 10, it is possible for the inner circumferential parts of the flange parts 15c of the bellows 15 to separate from the disc part 4b of the cartridge 4 and the side surface of the cup gasket 10, and it is possible to obtain a stable sealing performance and excellent tracking performance with respect to the eccentricity of the rotating shaft 1.

The material constituting the metal bellows 15 and the method for forming the bellows 15 are the same as those for the metal bellows 7 in the first example. The plate thickness of the metal bellows 15 is set so as to be smaller than the plate thickness of the metal cartridge 4.

In the present second example, the metal bellows 15 is formed so as to also function as a case, making it possible to reduce the number of components and reduce the number of welded locations.

THIRD EXAMPLE

Next, a description will be given for a mechanical seal according to a third example of the present invention with reference to FIG. 3. The third example, shown in FIG. 3, differs from the second example shown in FIG. 2 in that a band is attached on an outer circumference of an outer cylinder part of the metal bellows. However, other configurations are the same as those in the second example, and descriptions that overlap will not be provided.

Figure 3:
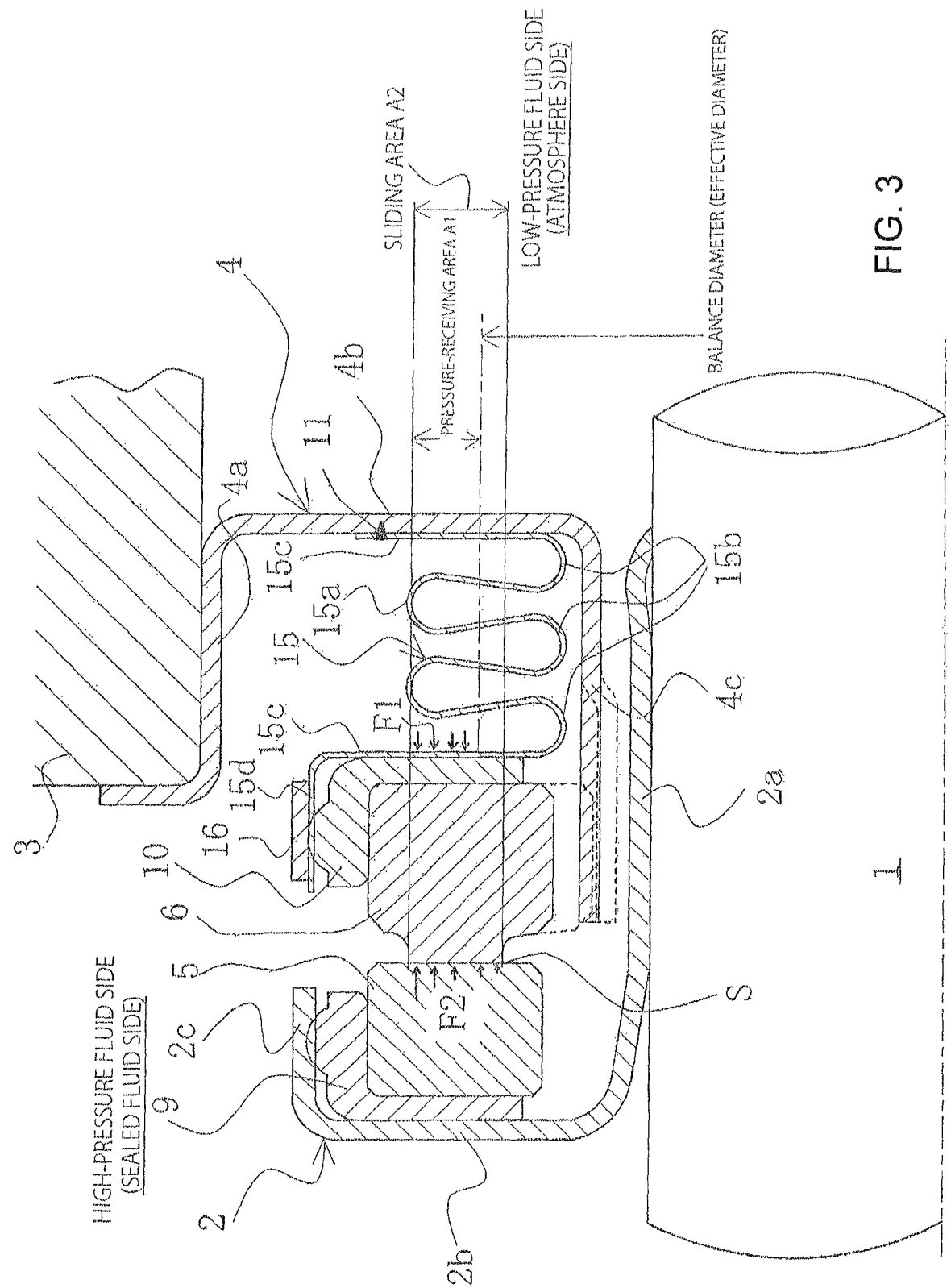
FIG. 3 is a vertical cross-section view showing a principal part of a mechanical seal according to a third example of the present invention.

In FIG. 3, a band 16 is attached on the outer circumference of the outer cylinder part 15d of the metal bellows 15. The band 16 squeezes the outer cylinder part 15d radially inwards so as to act against the radially outward elastic force of the cup gasket 10. The band 16 comprises, e.g.: a hose-band-type [element] made from a ring-shaped, flat plate capable of elastically deforming and configured so that the diameter is decreased by tightening, by screwing, the circumferential-direction bonding part; a plate-clip-type [element] (one-touch hose clamp) similarly made from a ring-shaped flat plate capable of elastically deforming and configured so as to be capable of being operated in the diameter-expanding direction at one touch against the elastic force acting in the contracting direction; or a C-ring-type [element] in which a ring-shaped flat plate capable of elastically deforming is cut at one location.

In the present third example, the band 16 squeezes the outer cylinder part 15d radially inwards against the radially outward elastic force of the cup gasket 10, therefore making the fitting between the outer cylinder part 15d of the bellows 15 and the cup gasket 10 more reliable.

FOURTH EXAMPLE

Figure 4:
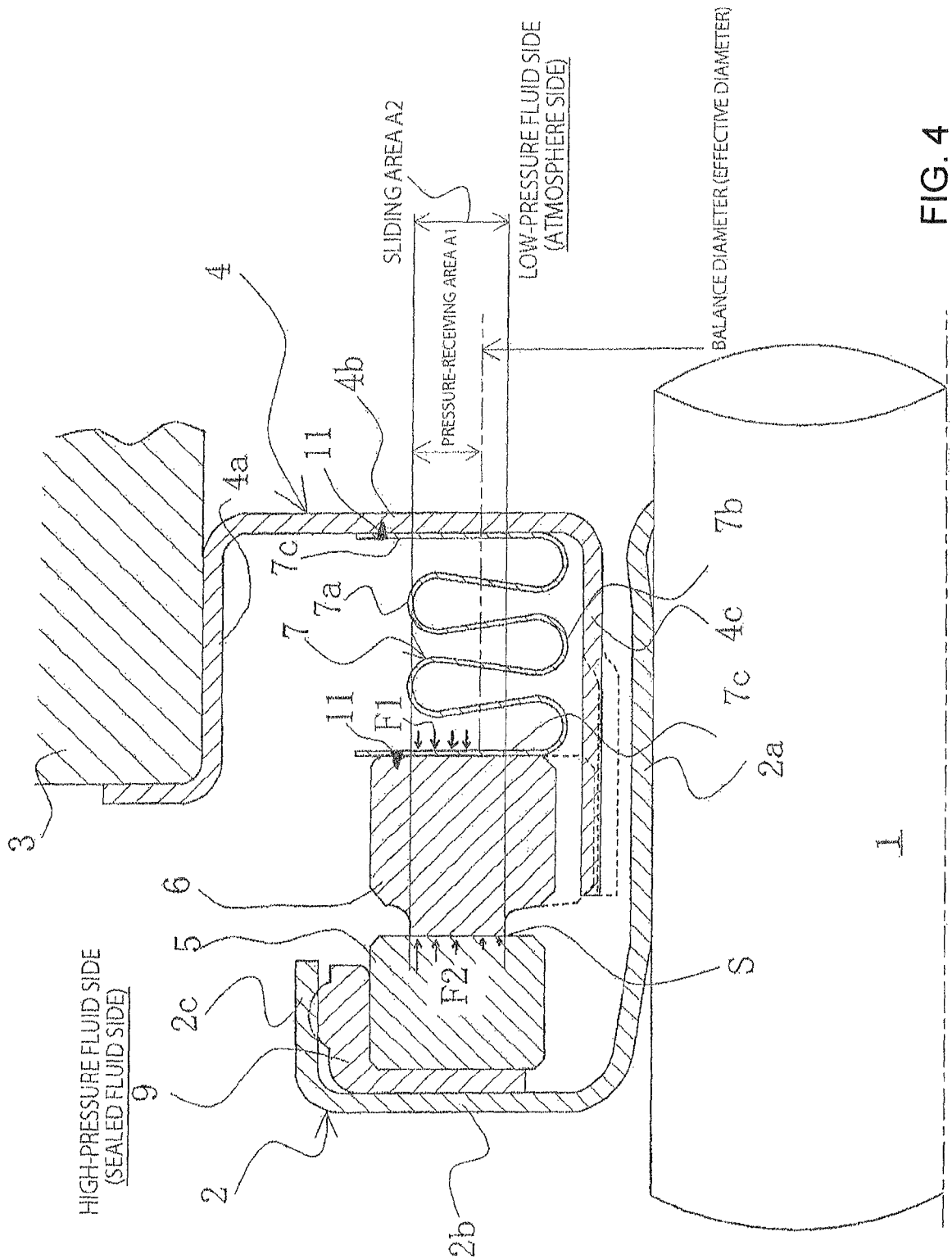
FIG. 4 is a vertical cross-section view showing a principal part of a mechanical seal according to a fourth example of the present invention.

Next, a mechanical seal according to a fourth example of the present invention will be described with reference to FIG. 4. The fourth example, shown in FIG. 4, differs from the first example shown in FIG. 1 in that the flange part of the metal bellows and the fixed-side sealing ring are directly fixed; however, other configurations are the same as those in the first example, and descriptions that overlap will not be provided.

If the fixed-side sealing ring 6 is made from a material that can be metal-welded, the metal bellows 7 can be directly welded to the fixed-side sealing ring 6 without using the case 8 and the cup gasket 10 shown in FIG. 1. In FIG. 4, the flange parts 7c, 7c at both ends of the bellows 7 are fixed to the disc part 4b of the cartridge 4 and side 6a opposite the sealing face of the fixed-side sealing ring 6. When the fixing is performed, [the bellows] is directly welded or fused to the fixed-side sealing ring 6 and the cartridge 4 at each position 11 located slightly further towards the inner diameter side relative to the outer diameter of the flange part 7c formed so as to be greater than the outer diameter of the crest parts 7a of the bellows 7.

Examples of materials constituting the fixed-side sealing ring 6 include stainless steel (SUS304), a sintered metal, a superhard alloy, or silicon carbide (SiC). Fixing can be performed by welding if the material constituting the fixed-side sealing ring 6 is stainless steel (SUS304) or a sintered metal, or by brazing if the material is a superhard alloy or silicon carbide (SiC).

In the present fourth example, the case 8 and the cup gasket 10 as shown in FIG. 1 are not used; therefore, it is possible to reduce the number of components and reduce the axial length of the mechanical seal. Alternatively, instead of reducing the axial length of the mechanical seal, it is also possible to increase the number of crests of the metal bellows 7.

FIFTH EXAMPLE

Next, a description will be given, for a mechanical seal according to a fifth example of the present invention with reference to FIGS. 5 and 9. The fifth example, shown in FIG. 5, differs from the first through fourth examples shown in FIG. 1 through 4 in being a "fixed-side/rotation-side-crimped" integrated type in which the cartridge and the sleeve can be prevented from axial detachment. Other configurations, such as the balance value being set to a range of 50%≤balance value≤100%, are the same as those in the aforementioned examples, and descriptions that overlap will not be provided.

FIG. 9 is a reference example for illustrating the mechanical seal according to the fifth example of the present invention. The mechanical seal) is of a type in which a distal end 2d of the inner cylinder part 2a of the sleeve 2 is expanded in diameter by crimping and caused to engage with the inner cylinder part 4c of the cartridge 4, thereby preventing the cartridge 4 and the sleeve 2 from axial detachment, wherein:

the inner cylinder part 4c of the cartridge 4 is provided with a stepped part 4d, which engages with the distal end 2d of the inner cylinder part 2a of the sleeve 2. The stepped part 4d is formed by a portion of the inner cylinder part 4c on the side towards the disc part 4b being shaped so as to expand in diameter. The distal end 2d, having a diameter expanded by crimping, of the inner cylinder part 2a is fitted into the expanded-diameter portion of the inner cylinder part 4c, and the distal end 2d and the stepped part 4d engage with each other.

As shown in FIG. 9, in order to provide a stepped part 4d to the inner cylinder part 4c of the cartridge 4, it is necessary to have the inner diameter of the bellows 7 be larger than the inner diameter of the bellows in first through fourth examples and provide a given gap with respect to the inner cylinder part 4c. If the inner diameter of the bellows 7 is increased, assuming the outer diameter to be uniform, the effective diameter will increase, and the pressure-receiving area A1 on which the bellows 7 receives pressure from the sealed fluid will decrease; therefore, a problem is presented in that the balance value=A1/A2 (where A2 is the area of the sealing face) will decrease and the amount of leakage will increase. Increasing the outer diameter of the bellows 7 would increase the pressure-receiving area A1 and also increases the balance value. However, increasing the outer diameter of the bellows 7 would present problems of impeding the task of welding the bellows 7 to the cartridge 4 or other metal components and increasing the outer diameter of the mechanical seal, and is therefore not practical.

Figure 5:
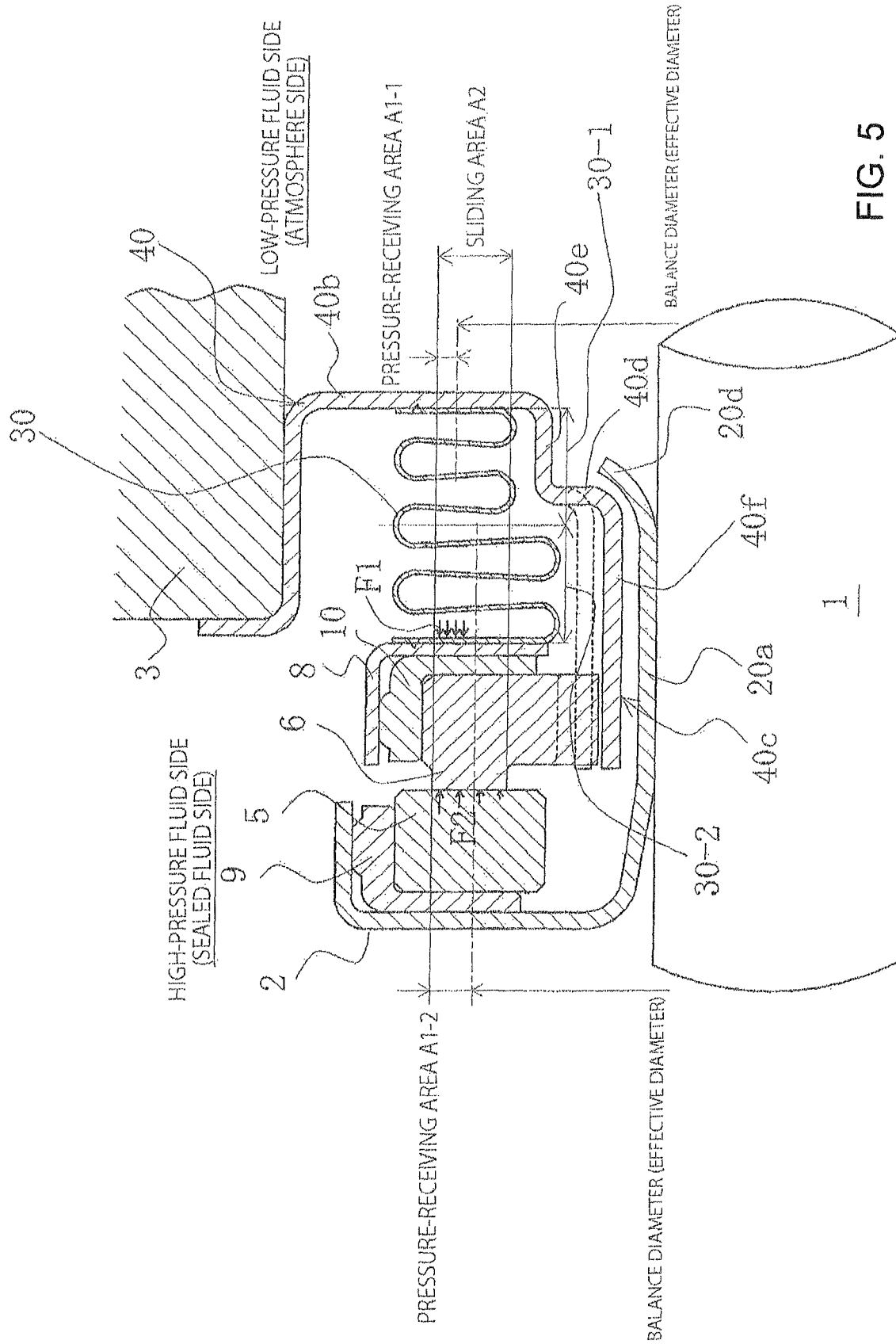
FIG. 5 is a vertical cross-section view showing a principal part of a mechanical seal according to a fifth example of the present invention.

The mechanical seal according to the fifth embodiment of the present invention resolves the problems presented by the reference example, and FIG. 5 is a vertical cross-section view showing the principal part of the mechanical seal. The dashed lines in FIG. 5 indicate the cross-section of a rotation locking part provided to a part of the circumferential direction of the fixed-side sealing ring 6, and solid lines indicate the cross-section of a portion other than the rotation locking part. In the first through fourth examples in FIG. 1 through 4, the solid lines indicate a rotation locking part and the dashed lines indicate a portion other than the rotation locking part, in contrast to FIG. 5.

In FIG. 5, in order to prevent a cartridge 40 and a sleeve 20 from axial detachment by expanding the diameter of a distal end 20d of an inner cylinder part 20a of the sleeve 20 and causing the distal end 20d to engage with an inner cylinder part 40c of the cartridge 40, a portion of the inner cylinder part 40c of the cartridge 40 on the side towards a disc part 40b is expanded in diameter, an expanded diameter part 40e is formed, and a stepped part 40d is provided. The stepped part 40d, which engages with the distal end 20d of the inner cylinder part 20a of the sleeve 20, is provided. The distal end 20d, having a diameter expanded by crimping, of the inner cylinder part 20a of the sleeve 20 engages with the stepped part 40d of the inner cylinder part 40c, whereby the cartridge 40 and the sleeve 20 are prevented from axial detachment, and the fixed side and the rotation side are integrated.

The metal bellows 30 has an outer diameter identical to that in the above reference example, and has an inner diameter, at a portion located on the side of the fixed-side sealing ring 6 relative to the stepped part 40d of the inner cylinder part 40c of the cartridge 40, formed so as to be smaller than the inner diameter of the portion located on the opposite side to the fixed-side sealing ring 6 relative to the stepped part 40d of the inner cylinder part 40c of the cartridge 40. In other words, the metal bellows 30 is shaped so that the inner diameter side is stepped in cross-section.

In order to facilitate description, the portion of the bellows 30 having a larger inner diameter may be hereafter referred to as a large inner diameter part 30-1 and the portion having a smaller inner diameter may be hereafter referred to as a small inner diameter part 30-2.

The large inner diameter part 30-1 of the bellows 30 has the same effective diameter as that in the above reference example; therefore, the pressure-receiving area A1-1 represented by the area between the effective diameter and the outer diameter of the sealing face S is smaller, and the balance value is also smaller. In contrast, the small inner diameter part 30-2 of the bellows 30 has a smaller effective diameter than that of the large inner diameter part 30-1; therefore, the pressure-receiving area A1-2 represented by the area between the effective diameter and the outer diameter of the sealing face S is larger, and the balance value is also larger. Therefore, the overall balance value of the bellows 30 is larger than that of the bellows shown in FIG. 9 in which the outer diameter is the same and a step is not present (reference example), and it is possible to suppress a decrease in the balance value and reduce the amount of leakage at the sealing face S. In addition, it is also possible to suppress an increase in the spring constant of the bellows 30.

In the present example, the mechanical seal) is of a type in which the distal end 20d of the inner cylinder part 20 of the sleeve 20 is expanded in diameter by crimping and caused to engage with the inner cylinder part 40c of the cartridge 40, thereby preventing the cartridge 40 and the sleeve 20 from axial detachment, wherein:

a portion of the inner cylinder part 40c of the cartridge 40 located on the opposite axial-direction side relative to the fixed-side sealing ring side 6 is expanded in diameter and provided with the stepped part 40d; and the bellows 30 is formed so that the inner diameter of a portion positioned on the fixed-side sealing ring 6 side relative to the stepped part 40d of the inner cylinder part 40c of the cartridge 40 is smaller than the inner diameter of a portion positioned on the opposite side from the fixed-side sealing ring 6 relative to the stepped part 40d. Therefore, compared to an instance in which the outer diameter of the bellows is the same and the inner diameter is increased in a uniform manner, the balance value is greater, a decrease in the balance value can be suppressed, and the amount of leakage at the sealing face S can be reduced. It is also possible to suppress an increase in the spring constant of the bellows 30. In other words, [the present example] has a beneficial effect of it being possible to suppress a decrease in the balance value, reduce the amount of leakage at the sealing face, and suppress an increase in the spring constant of the bellows 30, without increasing the outer diameter of the bellows.

SIXTH EXAMPLE

Figure 6:
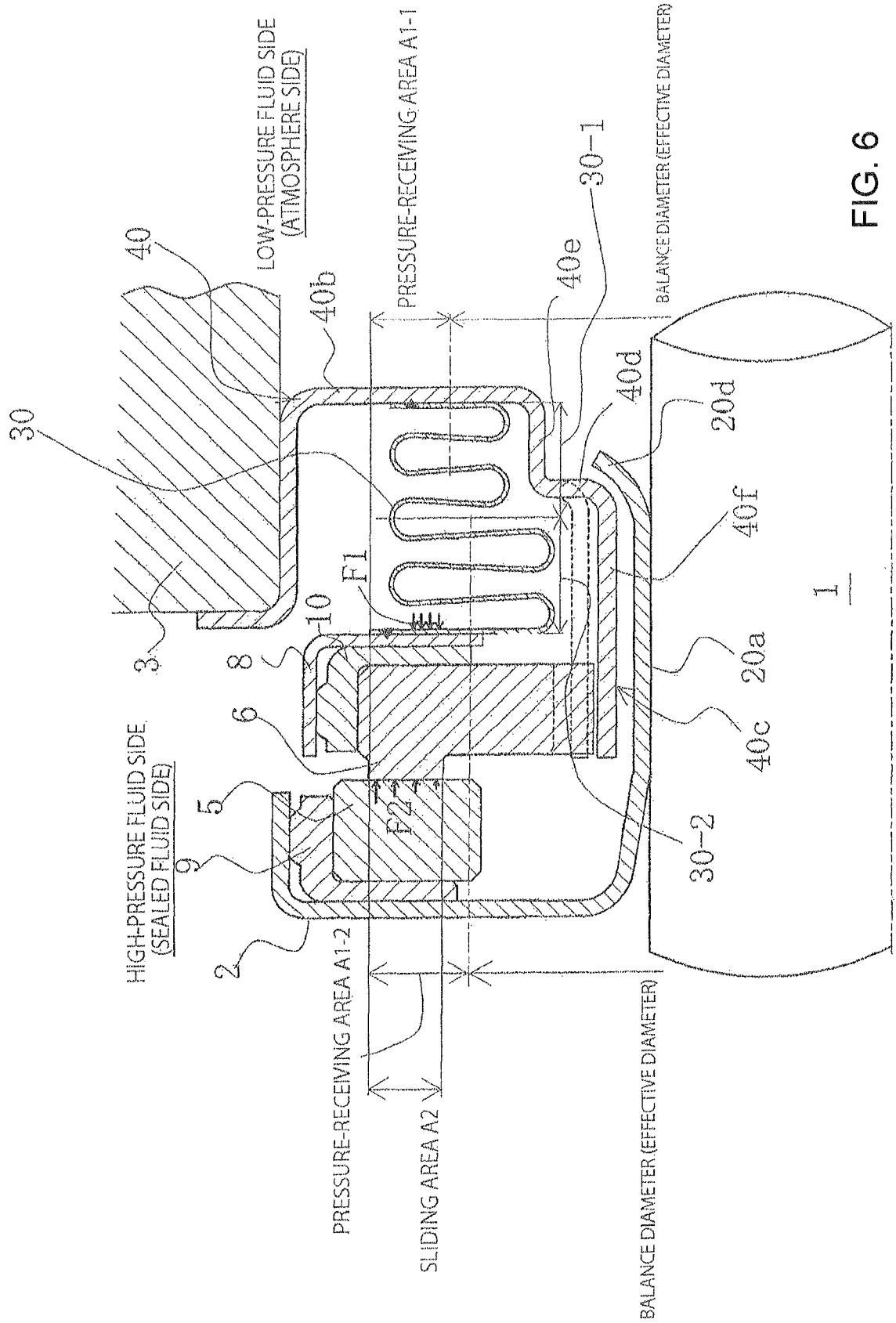
FIG. 6 is a vertical cross-section view showing a principal part of a mechanical seal according to a sixth example of the present invention.
Figure 7:
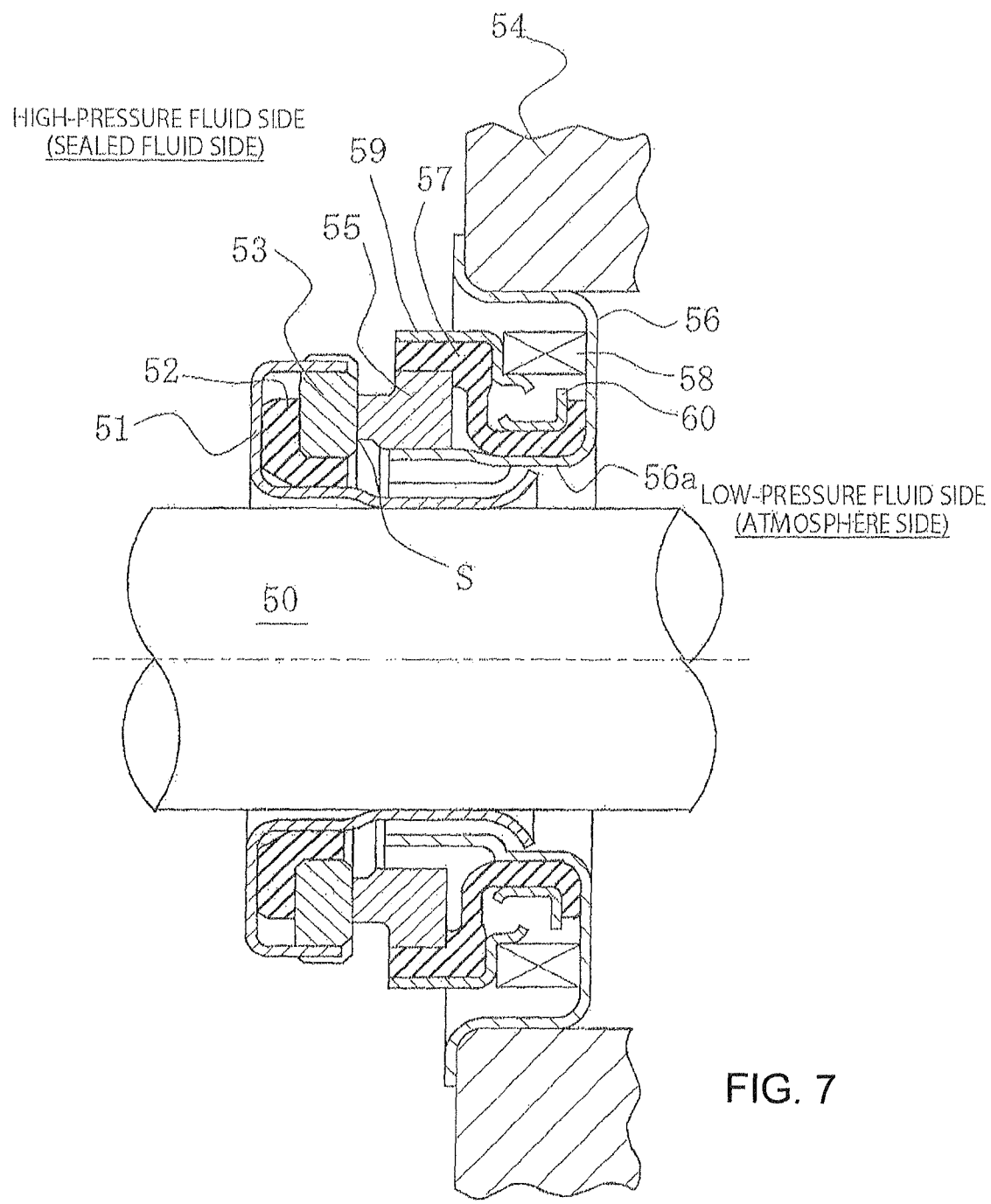
FIG. 7 is a vertical cross-section view showing a principal part of a mechanical seal according to prior art 1.
Figure 8:
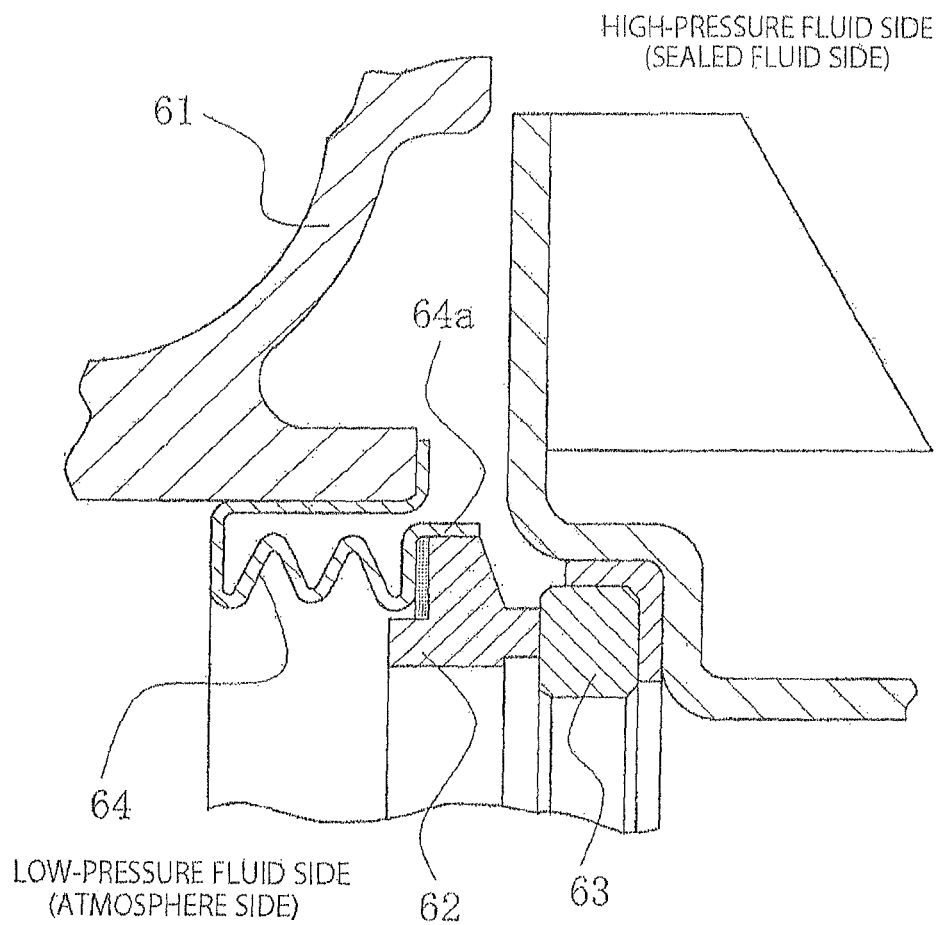
FIG. 8 is a vertical cross-section view showing a principal part of a mechanical seal according to prior art 2.

Next, a description will be given for a mechanical seal according to a sixth example of the present invention with reference to FIG. 6. The sixth example shown in FIG. 6 is similar to the fifth example shown in FIG. 5 in being a "fixed-side/rotation-side-crimped" integrated type in which the cartridge and the sleeve can be prevented from axial detachment, but differs from the fifth example shown in FIG. 5 in having the balance value set so as to exceed 100%. In the following description, descriptions that overlap with those for the fifth example will not be provided.

In the sixth example shown in FIG. 6, if A1 represents the pressure-receiving area of the metal bellows 30 at which pressure from the sealed fluid is received (i.e., the average value between the pressure-receiving area A1-1 and the pressure-receiving area A1-1) and A2 represents the sliding area between the rotation-side sealing ring 5 and the fixed-side sealing ring 6, the balance value represented by the ratio A1/A2 is set so as to exceed 100%.

In order to set the balance value so as to exceed 100%, it is necessary to have the inner diameter of the sealing face between the rotation-side sealing ring 5 and the fixed-side sealing ring 6 be larger than the balance diameter (effective diameter) of the bellows 30. Therefore, a problem is presented in that if the balance diameter of the bellows 30 is uniform, the diameters of the rotation-side sealing ring 5 and the fixed-side sealing ring 6 will increase, and the size of the mechanical seal will increase. According to the present example 6, the small inner diameter part 30-2 of the bellows 30 has a smaller effective diameter than that of the large inner diameter part 30-1, therefore making it possible to suppress an increase in size of the sealing face between the rotation-side sealing ring 5 and the fixed-side sealing ring 6.

In the present example, {the mechanical seal} is of a type in which the distal end 20d of the inner cylinder part 20 of the sleeve 20 is expanded in diameter by crimping and caused to engage with the inner cylinder part 40c of the cartridge 40, thereby preventing the cartridge 40 and the sleeve 20 from axial detachment, wherein: a portion of the inner cylinder part 40c of the cartridge 40 located on the opposite axial-direction side from the fixed-side sealing ring 6 side is expanded in diameter and provided with a stepped part 40d; and the bellows 30 is formed so that the inner diameter of a portion positioned on the fixed-side sealing ring 6 side relative to the stepped part 40d of the inner cylinder part 40c of the cartridge 40 is smaller than the inner diameter of a portion positioned on the opposite side from the fixed-side sealing ring 6 relative to the stepped part 40d. Therefore, compared to an instance in which the outer diameter of the bellows is the same and the inner diameter is increased in a uniform manner, even if the balance value is set so as to exceed 100%, it is possible to suppress an increase in the inner diameter of the sealing face between the rotation-side sealing ring 5 and the fixed-side sealing ring 6. In other words, [the present example] has a prominent effect of enabling the balance value to be set so as to exceed 100% and avoid an increase in size of the mechanical seal without significantly increasing the diameters of the rotation-side sealing ring 5 and the fixed-side sealing ring 6.

While embodiments of the present invention have been described, above on the basis of examples, the specific configurations are not limited to those according to the examples, and the present invention includes instances in which a variety of modifications and additions have been made without departing from the scope of the present invention.

For example, in the aforementioned examples, descriptions have been given with regards to instances in which the mechanical seal of the present invention is applied to a pump. However, this is not provided by way of limitation; [the mechanical seal of the present invention] can be applied, e.g., to a compressor, a submersible motor, or other industrial machinery.

In the aforementioned examples, descriptions have been given with regards to instances in which the cartridge 4 and the case 8 are formed from a metal. However, [the material] is not limited to a metal, and any material having a high corrosion resistance can be used, e.g., a plastic. In such an instance, the fixing with the metal bellows may be performed, e.g., by adhesion using an adhesive or bonding using laser.

As can be seen by the fact that, e.g., descriptions were given for instances in which the balance value is set to a range of 50%≤balance value≤100% in the first through fifth examples and a description was given for an instance in which the balance value exceeds 100% in the sixth example, the present invention can be applied to any balance value. The balance value is set as appropriate according to factors such as the pressure and the type of the sealed fluid.

For example, in the fifth and sixth examples, the effect of the present invention was described using examples of instances in which the outer diameter of the bellows is the same in order to facilitate comprehension, this is not provided by way of limitation. Even when there is a fluctuation in the outer diameter of the bellows 30, the effect of the present invention can be obtained. In short, the technical significance is in reducing the inner diameter of a portion of the bellows 30 and thereby preventing the balance value from decreasing and suppressing an increase in the size of the rotating ring and the fixed ring in a type [of mechanical seal] in which the fixed side and the rotation side are integrated.

In other words, when, as in the fifth example, [the balance value] is within the range of 50%≤balance value≤100%, the balance value is prevented form decreasing, and when, as in the sixth example, the balance value exceeds 100%, an increase in the diameters of the rotation-side sealing ring and the fixed-side sealing ring is suppressed and an increase in size of the mechanical seal is avoided.

REFERENCE SIGNS LIST

1 Rotating shaft
2 Sleeve
3 Housing
4 Cartridge
5 Rotation-side sealing ring
6 Fixed-side sealing ring
7 Metal bellows
8 Case
9 Cup gasket
10 Cup gasket
15 Metal bellows
16 Band
20 Sleeve
30 Metal bellows
40 Cartridge

The invention claimed is:

1. An inside-type mechanical seal comprising a sleeve fixed to a rotating shaft, and a cartridge fixed to a housing; a rotation-side sealing ring being provided to said sleeve; and a fixed-side sealing ring, which slides against said rotation-side sealing ring, and a bellows for axially urging the fixed-side sealing ring, being provided to said cartridge; the mechanical seal being characterized in that:
   said bellows is made from a metal; and
   said metal bellows has one end fixed to a case for holding said fixed-side sealing ring and another end fixed to said cartridge, the plate thickness of said metal bellows being set so as to be smaller than the plate thickness of said case or said cartridge;
   being of a type in which a distal end of an inner cylinder part of said sleeve is expanded in diameter by crimping and caused to engage with an inner cylinder part of said cartridge, thereby preventing said cartridge and said sleeve from axial detachment, wherein:
   a portion of the inner cylinder part of said cartridge located on the opposite axial-direction side relative to said fixed-side sealing ring side is expanded in diameter and provided with a stepped part, the stepped part having a radial section connecting two diameter sections, the radial section substantially perpendicular to the diameter sections ; and
   said bellows is formed so that the inner diameter of a portion positioned on the fixed-side sealing ring side relative to the stepped part of the inner cylinder part of said cartridge is
   smaller than the inner diameter of a portion positioned on the opposite side from the fixed-side sealing ring relative to the stepped part of the inner cylinder part of said cartridge.

2. An inside-type mechanical seal comprising a sleeve fixed to a rotating shaft, and a cartridge fixed to a housing; a rotation-side sealing ring being provided to said sleeve; and a fixed-side sealing ring, which slides against said rotation-side sealing ring, and a bellows for axially urging the fixed-side sealing ring, being provided to said cartridge; the mechanical seal being characterized in that:
   said bellows is made from a metal; and
   said metal bellows has one end fixed to a gasket for holding said fixed-side sealing ring and another end fixed to said cartridge, the plate thickness of the metal bellows being set so as to be smaller than the plate thickness of said cartridge;
   being of a type in which a distal end of an inner cylinder part of said sleeve is expanded in diameter by crimping and caused to engage with an inner cylinder part of said cartridge, thereby preventing said cartridge and said sleeve from axial detachment, wherein:
   a portion of the inner cylinder part of said cartridge located on the opposite axial-direction side relative to said fixed-side sealing ring side is expanded in diameter and provided with a stepped part, the stepped part having a radial section connecting two diameter sections, the radial section substantially perpendicular to the diameter section; and
   said bellows is formed so that the inner diameter of a portion positioned on the fixed-side sealing ring side relative to the stepped part of the inner cylinder part of said cartridge is smaller than the inner diameter of a portion positioned on the opposite side from the fixed-side sealing ring relative to the stepped part of the inner cylinder part of said cartridge.

3. An inside-type mechanical seal comprising a sleeve fixed to a rotating shaft, and a cartridge fixed to a housing; a rotation-side sealing ring being provided to said sleeve; and a fixed-side sealing ring, which slides against said rotation-side sealing ring, and a bellows for axially urging the fixed-side sealing ring, being provided to said cartridge; the mechanical seal being characterized in that:
   said bellows is made from a metal; and
   said metal bellows has one end directly fixed to said fixed-side sealing ring and another end fixed to said cartridge, the plate thickness of the metal bellows being set so as to be smaller than the plate thickness of said cartridge;
   being of a type in which a distal end of an inner cylinder part of said sleeve is expanded in diameter by crimping and caused to engage with an inner cylinder part of said cartridge, thereby preventing said cartridge and said sleeve from axial detachment, wherein:
   a portion of the inner cylinder part of said cartridge located on the opposite axial-direction side relative to said fixed-side sealing ring side is expanded in diameter and provided with a stepped part, the stepped part having a radial section connecting two diameter sections, the radial section substantially perpendicular to the diameter sections; and
   said bellows is formed so that the inner diameter of a portion positioned on the fixed-side sealing ring side relative to the stepped part of the inner cylinder part of said cartridge is smaller than the inner diameter of a portion positioned on the opposite side from the fixed-side sealing ring relative to the stepped part of the inner cylinder part of said cartridge.

* * * * *